C. McELROY.
Detaching Horses.
No. 92,333.   Patented July 6, 1869.
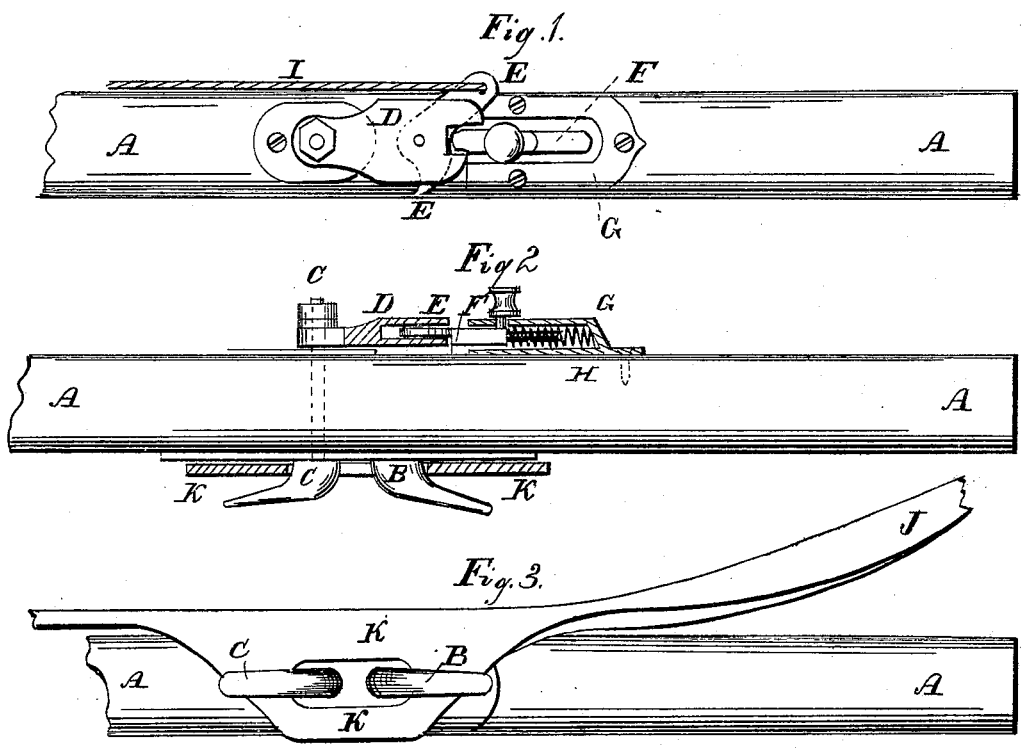

United States Patent Office.

C. McELROY, OF NEW BALTIMORE, MICHIGAN.

*Letters Patent No. 92,333, dated July 6, 1869.*

IMPROVED DEVICE FOR DETACHING HORSES FROM CARRIAGES.

The Schedule referred to in these Letters Patent and making part of the same.

*To all whom it may concern:*

Be it known that I, C. McELROY, of New Baltimore, in the county of Macomb, and State of Michigan, have invented a new and improved Device for Detaching Horses from Carriages; and I do hereby declare that the following is a full, clear, and exact description thereof, which will enable others skilled in the art to make and use the same, reference being had to the accompanying drawings, forming part of this specification, in which—

Figure 1 is an under-side view of a portion of a thill, to which my improved device has been attached.

Figure 2 is an inverted side view of the same, partly in section, to show the construction.

Figure 3 is a top view of the same.

Similar letters of reference indicate corresponding parts.

My invention relates to improvements upon the device patented by me, April 20, 1869, and has for its object to furnish improved means by which the horse may be instantly detached from the carriage when desired, and which will securely connect the tugs to the thills, holding them firmly; and It consists in the construction of various parts of the device, as hereinafter more fully described.

A is the thill, B is the stationary hook, C is the movable hook, the shank of which passes through the thill A, and to its lower end is attached an arm, D; in such a way that when either the arm or hook is moved, it may carry the other part with it.

The forward end of the arm D is slotted horizontally, as shown in fig. 2, and in the slot or recess thus formed is pivoted the trigger or catch-lever E.

The catch-lever E is made in the form shown in fig. 1, that is to say, the forward edge of its outer or shorter arm is made upon the arc of a circle, having for its centre the axis of the movable hook C, so that when the inner or longer arm of said lever-catch E is operated, the said curved edge may act as a cam, to push back the bolt F, allowing the arm D to swing inward, turning the hook C, and releasing the tug.

The forward end of the arm D is notched, as shown in fig. 1, to receive the lock-bolt F.

The end of the arm D, upon the outer side of the notch in said end, is rounded or bevelled off, as shown in fig. 1, so that when the arm D is pushed back to its place, to secure the tug, the said rounded part of its forward end may act as a cam to push the bolt F back, until the said arm reaches its proper position, when the said bolt springs into the said notch, securing the arm and hook in place.

The bolt F works in a case, G, attached to the thill A, and is held forward by a coiled or equivalent spring, H, as shown in fig. 2.

I is the trip-rope, one end of which is attached to the longer or inner end of the trigger E, and its other end extends back to the carriage, and is secured in such a position that it can be grasped and operated by the driver in an instant, when necessary to detach the horse.

J is the tug, to the lower edge of which is attached a lug, K, which overlaps the upper side of the thill A, and has a slot formed in it to receive the hooks B C.

This construction allows the tug to extend smoothly along the side of the horse, so that it will be impossible for it to chafe him.

Having thus described my invention,

I claim as new, and desire to secure by Letters Patent—

1. The arm D, constructed substantially in the manner herein shown and described, that is to say, having its forward end slotted, notched, and rounded, or bevelled off, as and for the purpose set forth.

2. The combination of the spring-bolt H F with the arm D and thill A, substantially as herein shown and described, and for the purpose set forth.

3. The trigger or catch-lever E, constructed substantially in the manner herein shown and described, in combination with the arm D and spring-bolt H F, as and for the purpose set forth.

C. McELROY.

Witnesses:
  WM. DILWORTH,
  J. L. THOMPSON.